US009897773B2

(12) United States Patent
Suzuki et al.

(10) Patent No.: US 9,897,773 B2
(45) Date of Patent: Feb. 20, 2018

(54) AUTO-FOCUS ACTUATOR UNIT WITH DUST BARRIER FOR CAMERA MODULE

(71) Applicant: ACTUATOR SOLUTIONS GMBH, Gunzenhausen (DE)

(72) Inventors: Yusuke Suzuki, Yokohama (JP); Ray Hu, Taoyuan (TW); Alex Chen, Gunzenhausen (DE)

(73) Assignee: ACTUATOR SOLUTIONS GMBH, Gunzenhausen (DE)

( * ) Notice: Subject to any disclaimer, the term of this patent is extended or adjusted under 35 U.S.C. 154(b) by 0 days.

(21) Appl. No.: 15/119,118

(22) PCT Filed: Sep. 3, 2015

(86) PCT No.: PCT/IB2015/056688
§ 371 (c)(1),
(2) Date: Aug. 15, 2016

(87) PCT Pub. No.: WO2016/038513
PCT Pub. Date: Mar. 17, 2016

(65) Prior Publication Data
US 2017/0075087 A1  Mar. 16, 2017

(30) Foreign Application Priority Data
Sep. 9, 2014  (IT) .............................. MI2014A1556

(51) Int. Cl.
G02B 7/02       (2006.01)
G02B 7/08       (2006.01)
G03B 17/02      (2006.01)
H04N 5/225      (2006.01)
G03B 3/10       (2006.01)
G02B 27/00      (2006.01)
G02B 5/20       (2006.01)

(52) U.S. Cl.
CPC ........... G02B 7/08 (2013.01); G02B 27/0006 (2013.01); G03B 3/10 (2013.01); G03B 17/02 (2013.01); H04N 5/2254 (2013.01); H04N 5/2257 (2013.01); G02B 5/208 (2013.01)

(58) Field of Classification Search
CPC . G02B 7/023; G02B 7/08; G02B 7/10; G02B 7/04; G02B 7/021; G02B 7/02; G02B 7/09; G02B 7/022; G02B 7/282
USPC .................................. 359/676–706, 811–830
See application file for complete search history.

(56) References Cited

U.S. PATENT DOCUMENTS 7,525,096 B2    4/2009  Nakajo et al.
2005/0116138 A1  6/2005  Hanada et al.
(Continued)

FOREIGN PATENT DOCUMENTS

EP    2287647 A1    2/2011
JP    2001/292365 A  10/2001
WO    2013/076350 A1  5/2013

Primary Examiner — Mahidere Sahle
(74) Attorney, Agent, or Firm — Steinfl + Bruno LLP

(57) ABSTRACT

An auto-focus actuator unit including a lens carrier slidably received within a stationary housing frame for a reciprocating motion provided by an actuator is described. The housing frame being carried by a bottom plate provided with an opening, in correspondence with one or more lenses carried by the lens carrier, and with a dust barrier projecting towards the lens carrier and having such a height as to maintain a vertical overlap with the lens carrier over the whole travel of the latter.

9 Claims, 3 Drawing Sheets

(56) References Cited

U.S. PATENT DOCUMENTS

| | | |
|---|---|---|
| 2005/0248684 A1 | 11/2005 | Machida |
| 2011/0096419 A1* | 4/2011 | Matsuo .................... G02B 7/08 359/820 |
| 2012/0236422 A1* | 9/2012 | Sue .......................... G02B 7/02 359/813 |
| 2013/0057965 A1 | 3/2013 | Iwasa |
| 2014/0002676 A1 | 1/2014 | Ning |

* cited by examiner

PRIOR ART

AUTO-FOCUS ACTUATOR UNIT WITH DUST BARRIER FOR CAMERA MODULE

CROSS REFERENCE TO RELATED APPLICATIONS

The present application is the US national stage of International Patent Application PCT/IB2015/056688 filed on Sep. 3, 2015 which, in turn, claims priority to Italian application MI2014A001556 filed on Sep. 9, 2014.

The present invention relates to auto-focus actuator units used in camera modules such as those incorporated in mobile phones and the like, and in particular to an actuator unit provided with a dust barrier.

It is known that a prior art camera module, such as that illustrated in FIGS. 1 and 2, essentially consists of a sensor unit SU with an actuator unit AU placed on top of it, the "top" being the side from where the incident light forming the image arrives. More specifically, the sensor unit SU includes a substrate S carrying an image sensor IS (e.g. a CCD, CMOS or the like) and a base B which has an opening BO above the image sensor IS, an infrared cut filter IRF being arranged in said opening BO to prevent the image sensor IS from receiving light of infrared wavelength and to seal the sensor unit SU.

The actuator unit AU includes a bottom plate BP provided with a corresponding opening BPO and carrying a housing frame HF, a lens carrier LC carrying one or more lenses L being slidably received for a reciprocating motion within the stationary housing frame HF. Said reciprocating motion can be provided, for example, by an electromagnetic actuator or by an actuator that includes a shape memory alloy (SMA) actuating member, and the motion travel is limited between the bottom plate BP and a shield can SC secured thereon that forms the outer casing of the actuator unit AU.

A drawback of such a camera module structure is that when the lens carrier LC is lifted up for focusing on the macro side, the dust inside the actuator unit AU is able to reach filter IRF through opening BPO following a path (indicated by the arrows) that opens up between the lens carrier LC and the surrounding elements, i.e. the housing frame HF and the bottom plate BP, thus causing defects on the image recorded by the image sensor IS. It should be noted that in the present context "dust" is meant to be any extraneous particle that may be present for any reason, e.g. dirt left over from the manufacturing process or caused by the wear of the components in relative motion.

U.S. Pat. No. 7,525,096 deals with this problem by providing a "dam member" intended to protect the IR cut filter from the dust, three embodiments of said dam member being illustrated as:

- a projecting ring, e.g. of epoxy resin, formed in the peripheral portion of the filter; or
- a projecting portion formed on the top surface of the base around the opening where the filter is arranged; or
- a groove formed on the top surface of the base around the opening where the filter is arranged.

Such arrangements are however not fully satisfactory and still suffer from some drawbacks for the following reasons:

- the dam member does not prevent the opening of the path to the dust but merely acts as an obstacle towards the filter, whereby the camera module can be moved by the user in such a way that the dust climbs over the obstacle and reaches the filter;
- the dam member is formed on the filter or on the top surface of the base of the sensor unit therefore it operates "downstream" from the actuator unit, whereas it would be preferable to prevent the dust from coming out of the actuator unit rather than trying to stop it on its path to the filter; and
- the dam member projects upwards with respect to the top surface of the base or is formed thereon thus making the coupling with the actuator unit difficult, in fact the illustrated camera module does not include a bottom plate and the housing frame is mounted directly on the base externally with respect to the dam member.

US 2005/116138 discloses a solid state image sensing device, without any auto-focusing capacity nor any actuator, in which the lens carrier is fixed to the housing frame by thermal welding after a focusing operation is performed as a step of the device manufacturing method, yet it is not possible to change focus during the use of the device. The lens holder is mounted on the housing frame through a threaded coupling which is preferably located on the outside of the housing frame such that when adjusting the focus, during the manufacturing process, any possible dust appearing from the threads when the lens carrier is turned will not fall inside of the housing frame and adhere to the infrared filter.

Therefore the object of the present invention is to provide an auto-focus actuator unit which overcomes the above-mentioned drawbacks. This object is achieved by means of an auto-focus actuator unit comprising a dust barrier formed on the top surface of the bottom plate and having such a height as to maintain a vertical overlap with the lens carrier over the whole travel of the latter. Other advantageous features are disclosed in the dependent claims.

The main advantage of this novel arrangement is that the movement of the lens carrier does not open up a path to the dust present inside the actuator unit, which therefore is unable to leave the unit and to reach the IR filter regardless of the orientation and motion of the camera module.

Another significant advantage of the present actuator unit stems from the fact that, once completed, it remains substantially sealed same as the sensor unit, whereby it is easier to handle and couple two sealed units without the risk of dust being between them upon coupling or during use.

Still another advantage of this actuator unit, with respect to the above-mentioned prior art, is that it allows to couple the actuator and sensor units along their whole facing surfaces, obviously except the openings for the passage of the incident light, whereby a stronger structure is achieved and the IR filter is firmly secured in its seat also by the bottom plate from above.

These advantages and characteristics of the auto-focus actuator unit with dust barrier according to the present invention will be clear to those skilled in the art from the following detailed description of two embodiments thereof, with reference to the annexed drawings wherein.

As previously mentioned, the definitions "top/bottom", "vertical/horizontal", "up/down" and so on are merely conventional and used only to describe the invention with reference to the drawings, being it clear that the actuator unit can be oriented in any way during manufacturing and use and these terms are not to be intended as limitative.

Figure 1:
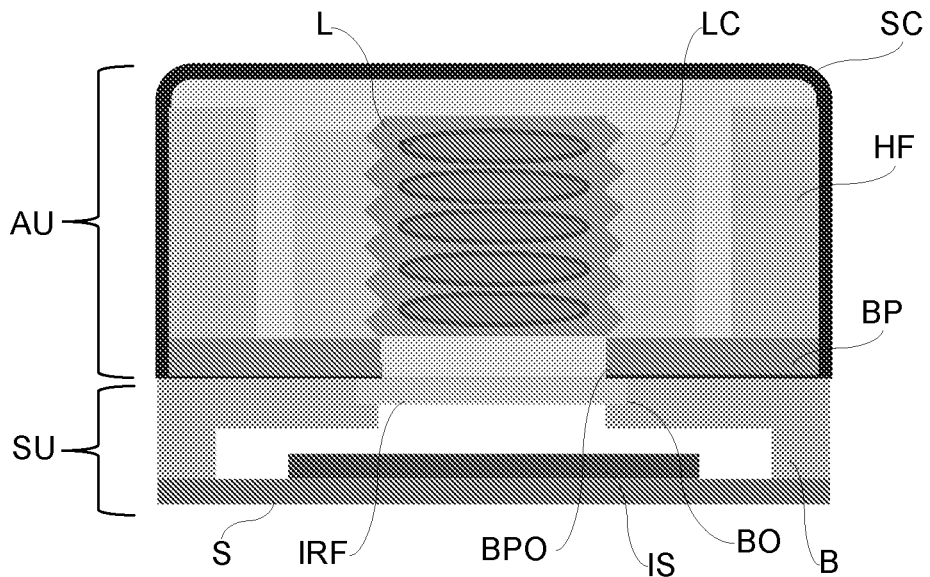
FIGS. 1 and 2 are diagrammatic vertical sectional views of a prior art camera module showing the lens carrier in its two end-of-travel positions.
Figure 2:
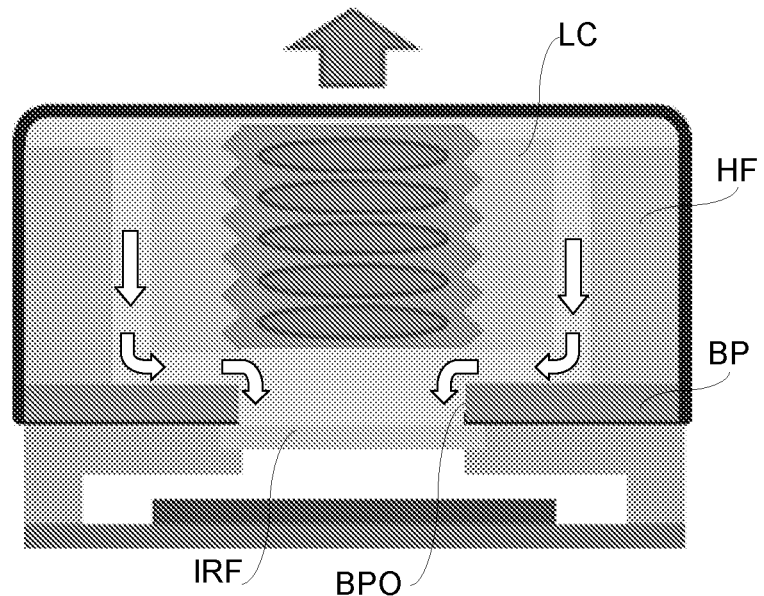
Figure 3:
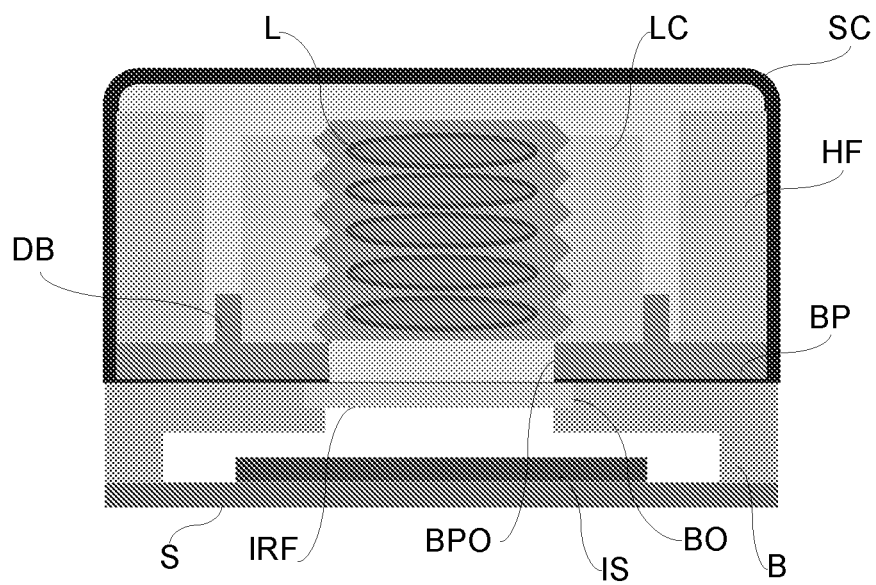
FIGS. 3 and 4 are views similar to the preceding ones of a camera module comprising an actuator unit according to a first embodiment of the invention.
Figure 4:
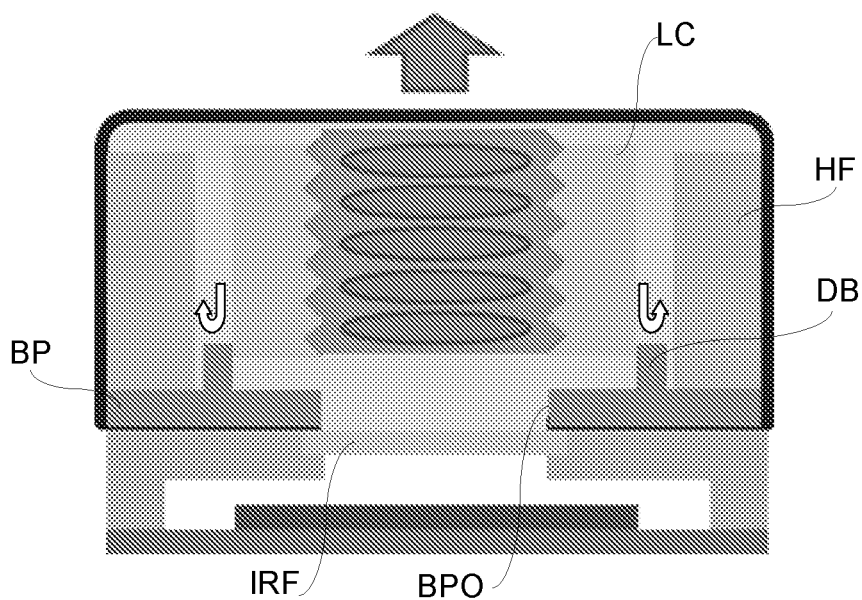

The first embodiment illustrated in FIGS. 3 and 4 differs from the prior art illustrated in FIGS. 1 and 2 in that a dust barrier DB is provided around the lens carrier LC on the top surface of the bottom plate BP. More specifically, said dust barrier DB projects perpendicularly towards the lens carrier LC and adjacent thereto, i.e. sufficiently close to prevent passage of the dust between them (preferably at a distance comprised between 0.05 and 0.5 mm), being also sufficiently high to maintain a vertical overlap with the lens carrier LC even when the latter is moved all the way up for focusing on the macro side (FIG. 4).

In this way, no path between the inside and outside of the actuator unit AU is opened at any position of the lens carrier LC even when it is farthest from the bottom plate BP, whereby the dust inside the unit cannot reach the IR cut filter IRF through the bottom plate opening BPO.

Figure 5:
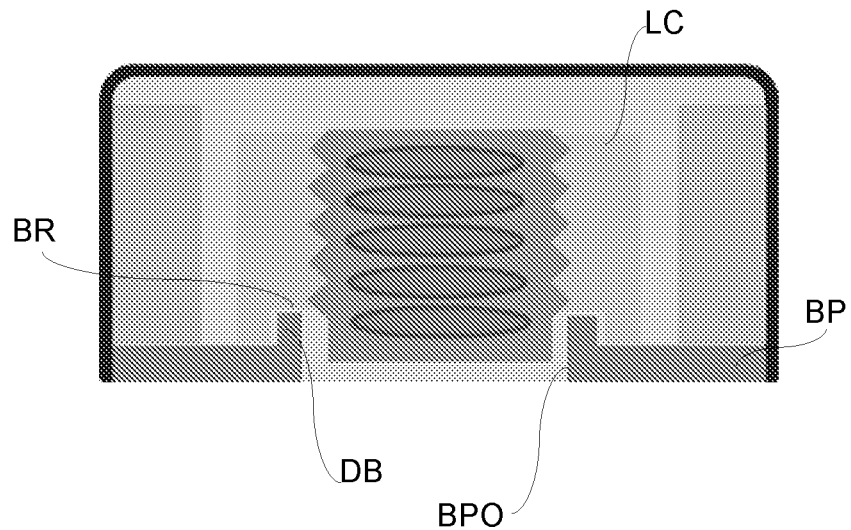
FIGS. 5 and 6 are views similar to the preceding ones of an actuator unit according to a second embodiment of the invention.
Figure 6:
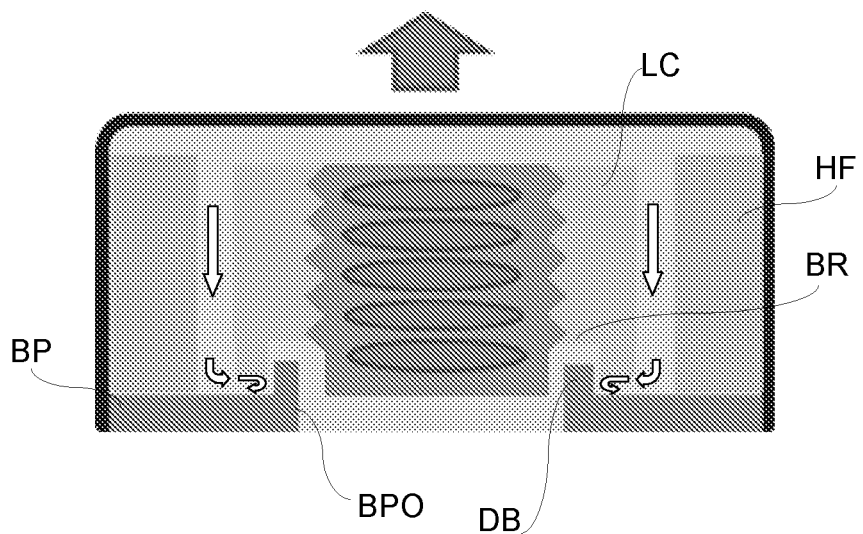

The second embodiment illustrated in FIGS. 5 and 6 differs from the first embodiment illustrated in FIGS. 3 and 4 in that the dust barrier DB is provided around the central opening BPO of the bottom plate BP, whereby the dust barrier DB is covered and enclosed by the lens carrier LC that has a corresponding bottom recess BR.

In other words, the same novel concept applied on the outside of the lens carrier LC in the first embodiment is now applied on the inside of the lens carrier LC in the second embodiment, such that the dust barrier DB always remains in vertical overlap with the lens carrier LC although on the inside thereof (FIG. 6).

It should be noted that the bottom recess BR is preferably sized to allow the lens carrier LC to abut on the bottom plate BP, but said recess could also be shorter than the dust barrier DB (as long as the vertical overlap is always maintained) whereby the lens carrier LC would abut on the top surface of the dust barrier DB rather than on the bottom plate BP.

It is clear that the above-described and illustrated embodiments of the auto-focus actuator unit according to the invention are just examples susceptible of various modifications. In particular, the exact shape, size and arrangement of the dust barrier DB and lens carrier LC (possibly with the bottom recess BR) can be somewhat changed as long as their vertical overlap is guaranteed at any time. For example, the dust barrier DB might have a cross-section that is triangular rather than rectangular as shown in the drawings, and/or it might be not perpendicular to the bottom plate BP but rather inclined towards the lens carrier LC (i.e. inwards in the first embodiment and outwards in the second embodiment).

Moreover, a gasket could be provided between the dust barrier DB and the lens carrier LC in order to achieve a dustproof sealing while possibly placing the two elements a little apart so as to prevent any possible problem of friction, for example due to a different thermal expansion. Furthermore, the two embodiments might be combined in order to obtain an even more dustproof unit with a double dust barrier.

The invention claimed is:

1. An auto-focus actuator unit, comprising: a lens carrier slidably received within a stationary housing frame for a reciprocating motion provided by an actuator, said housing frame being carried by a bottom plate provided with an opening in correspondence with one or more lenses carried by said lens carrier, wherein said bottom plate is also provided with a dust barrier projecting from a top surface thereof towards the lens carrier, said dust barrier having such a height as to maintain a distance with the lens carrier over the whole travel of the lens carrier, wherein the dust barrier and the lens carrier are sufficiently close to prevent passage of dust between each other, and wherein the distance between the dust barrier and the lens carrier is between 0.05 and 0.5 mm.

2. The auto-focus actuator unit according to claim 1, wherein a gasket that is suitable to achieve a dustproof sealing is provided between the dust barrier and the lens carrier.

3. The auto-focus actuator unit according to claim 1, wherein the dust barrier is located on the outside of the lens carrier.

4. The auto-focus actuator unit according to claim 1, wherein the dust barrier is located on the inside of the lens carrier that has a corresponding bottom recess.

5. The auto-focus actuator unit according to claim 4, wherein the dust barrier is provided around the opening of the bottom plate.

6. The auto-focus actuator unit according to claim 4, wherein the bottom recess of the lens carrier is sized to allow the latter to abut on the bottom plate.

7. The auto-focus actuator unit according to claim 1, wherein the dust barrier projects perpendicularly to the bottom plate.

8. The auto-focus actuator unit according to claim 1, further including a shield can, secured on the bottom plate, that forms the outer casing of the actuator unit.

9. A camera module comprising an actuator unit according to claim 1 placed on top of a sensor unit that includes a substrate carrying an image sensor and a base which has an opening above said image sensor and aligned with the opening in the bottom plate of the actuator unit, an infrared cut filter being arranged in said opening of said base.

* * * * *